UNITED STATES PATENT OFFICE.

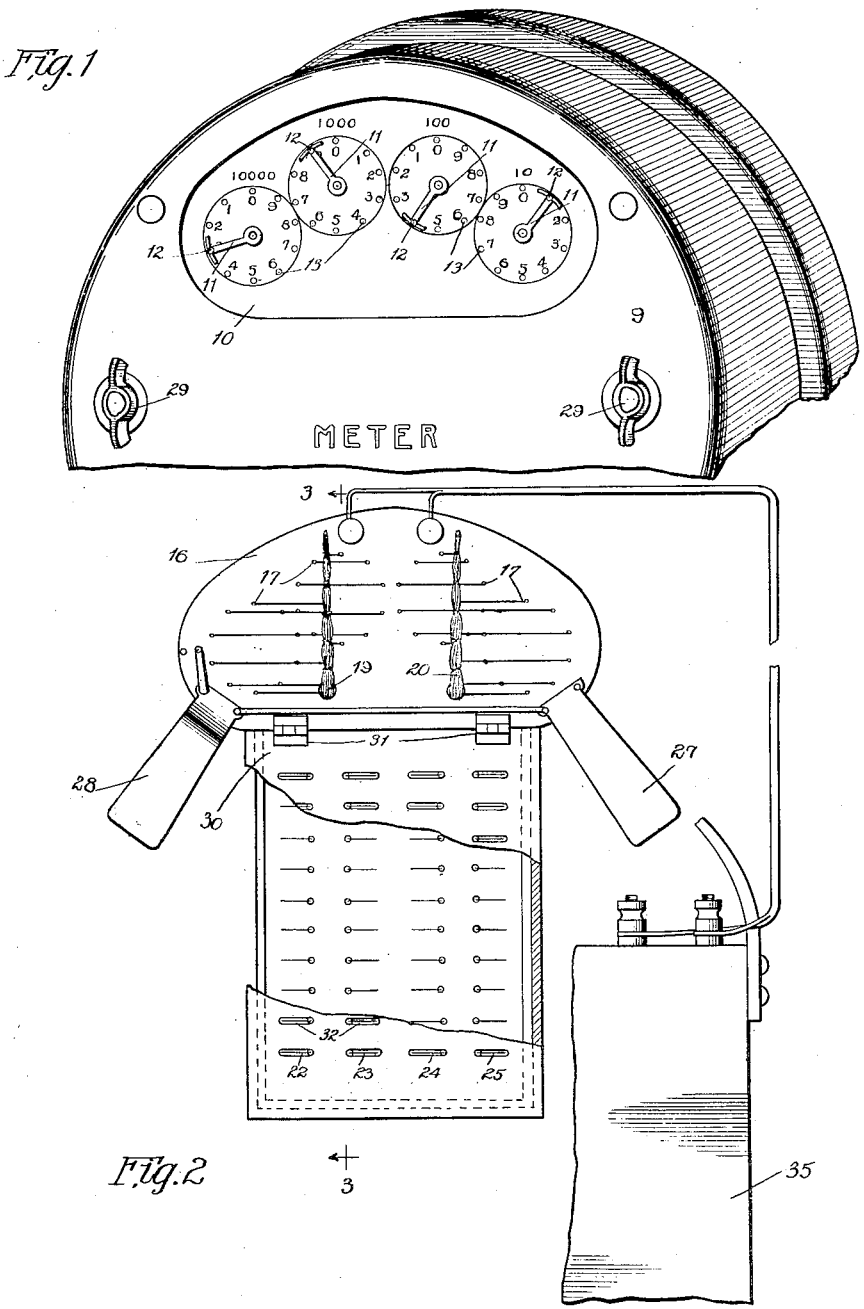

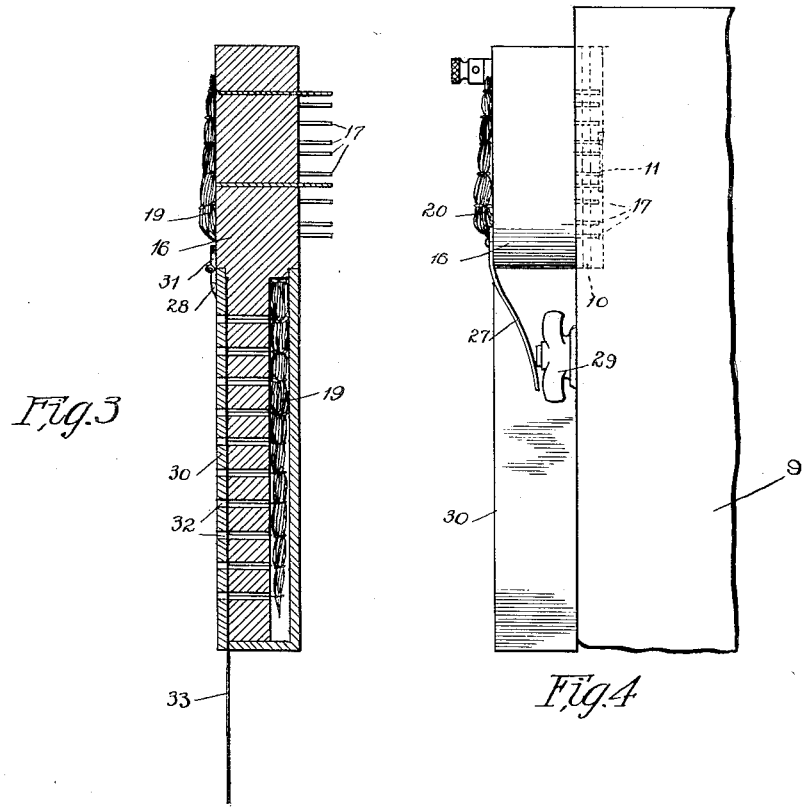

ANGUS S. HIBBARD, OF CHICAGO, ILLINOIS.

RECORDING DEVICE FOR METERS.

1,245,588.  Specification of Letters Patent.  Patented Nov. 6, 1917.

Application filed July 23, 1915. Serial No. 41,477.

*To all whom it may concern:*

Be it known that I, ANGUS S. HIBBARD, a citizen of the United States, residing at Chicago, in the county of Cook and State of Illinois, have invented a certain new and useful Improvement in Recording Devices for Meters, of which the following is a full, clear, concise, and exact description, reference being had to the accompanying drawings, forming a part of this specification.

My invention relates to recording devices for meters and to the method of recording meter readings by burning a permanent record of the meter indication onto a sheet of paper prepared for such record.

An object of my invention is to provide a method and mechanism for practically eliminating the personal element in the reading of meters whereby mistakes and inconvenience will be greatly reduced. A further object is to provide ready means for duplicating, or even triplicating, the record of meter readings and for producing a record which cannot readily be altered without detection.

My invention embodies the principle of automatically recording by designations placed in distinctive positions upon a record sheet the indicating positions of the hands of a meter as determined by means of a plurality of electric circuits temporarily associated with the meter and selectively completed through the meter indicating devices.

The apparatus for carrying out my invention is preferably of a portable type adapted to be carried by the person authorized to make meter readings, and the meters themselves may or may not be constructed so that they can be readily read without the aid of the electrical recording apparatus of my invention.

Other objects of my invention will be more fully pointed out in the following description and appended claims.

My invention is illustrated in the accompanying drawings in which similar parts are designated throughout the several views by the use of like characters, and in which—

Figure 1 is a face view of that portion of a meter which contains the usual dial and moving hands modified for use with my recording device.

Fig. 2 is a plan of a preferred form of my device, including a portion of a battery.

Fig. 3 is a section taken on the lines 3—3 of Fig. 2.

Fig. 4 is a right elevation of the device in place upon the face of a meter.

Fig. 5 is a form of recording sheet with the record 3941 burned thereon.

Figure 6:
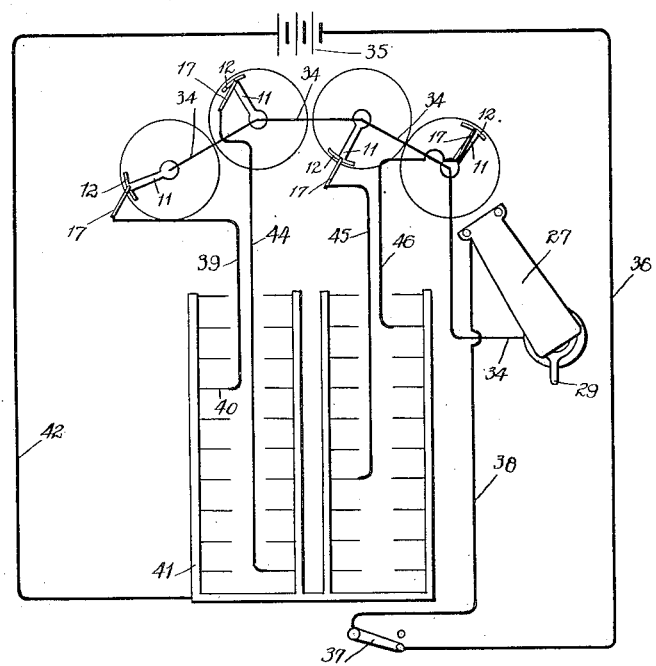
Fig. 6 is a preferred circuit arrangement for the recording device of Fig. 2.

It is to be understood that my invention is applicable to any form of meter and that the meter 9 illustrated in Fig. 1 is intended to be typical of water, gas, electricity, or any other type of meter, clocks, scales, or other devices, having indicating hands which operate over dials and a record of which is desired.

The meter here illustrated is provided with four dials situated behind a plate of glass 10, each dial being provided with a hand, or movable element, 11, upon the end of which is carried a spring contact member 12 sufficient in length that a portion of each of said contact pieces will always stand under one of the perforations 13 of each of the dials of the meter. These perforations through the glass cover of the dials are circumferentially arranged, there being one perforation for each numerical indication on each of the dials. Obviously, the glass cover 10 may be hinged or made otherwise removable in which case the perforations therein are unnecessary.

The recording device particularly illustrated in Fig. 2 comprises a block of insulating material 16, preferably shaped to correspond with the opening through the metal front of the meter, and provided with a plurality of small metallic pins 17 which project from the reverse side of the block 16, as shown more clearly in Figs. 3 and 4. These pins correspond in position and number with the holes or perforations 13 in the glass dial cover of the meter and are of proper length so that at least one pin of each set will engage the spring contact maker 12 carried upon the associated hand of the meter. These pins may be reciprocally mounted in the block 16 and provided with springs to insure their proper engagement with the meter hands. Each of the pins is electrically connected by means of conductors formed into cables 19 and 20 with one of the heating elements 22, 23, 24, and 25, which appear upon the face of the insulating block 16 in rows corresponding to the various dials of the meter, there being as many heating elements in each row as there are figures about the corresponding meter dial. It will be understood that, as shown in Fig. 5, the uppermost heating elements are in electrical connection with the pins registering with the perforations coming opposite the numerals one in each of the dials, and that correspondingly each of the heating elements is in electrical connection with the pin which registers with the position in the dial corresponding to the position which the heating element occupies in its column.

In order that the hands and contact makers of the meter may be brought into circuit relation with the recording device when the latter is placed in position on the face of the meter a pair of spring members 27 and 28 are provided, these being so positioned on the insulating block 16 that they come into contact with unenameled portions of the meter frame. In the illustrated embodiment these are arranged to contact with the thumb nuts 29 by means of which the meter cover is retained in position. It will be understood that the shape and position of the spring members 27 and 28 will be altered to register with some exposed metallic portions of whatever class meter is being read, and that it may be necessary in some cases to scrape the enamel from certain portions of the meter in order that proper contact with the meter frame can be secured.

Figure 7:
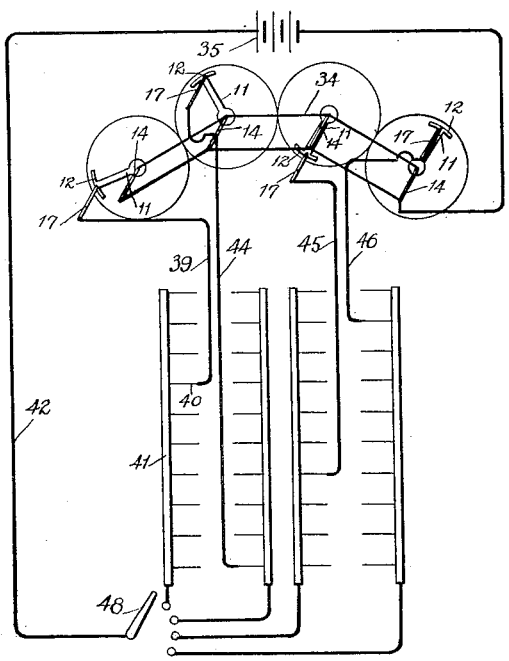
Fig. 7 is a modification of the circuit arrangement requiring a battery of less current capacity.

A modification of the foregoing method of establishing connection with the meter hands is illustrated in Fig. 7 wherein additional contact pins are used to connect with the pivotal points of the moving hands, thus eliminating the necessity of the current passing through the oily bearings surrounding the pivots upon which the hands rotate.

The recording device is preferably provided with a cover plate 30 secured to the block 16 by hinges 31, the perforations 32 in this cover plate providing a passage whereby air may be communicated with the paper 33 which is being scorched so that a more rapid oxidization will occur.

In Fig. 6 I have illustrated the preferred circuit arrangement of my recording device and have shown therein the circuits which would be involved in burning the record of the meter reading 3941. In this figure the conductor 34 represents the metallic part of the meter by means of which the hands are connected together. The circuit may be traced from the battery 35 through conductor 36, switch 37, conductor 38, spring 27, thumb nut 29, conductor 34, hand 11, spring contact 12, and pin 17 of the 10,000 dial, conductor 39, heating element 40, common plate 41, and conductor 42 back to the other pole of battery 25. Other parallel circuits may be similarly traced through conductors 44, 45, and 46 and their respective heating elements to the common plate 41. By means of the circuits just described four heating elements are simultaneously brought into circuit and are thus caused to glow, or become sufficiently heated to burn a record upon the paper or record sheet, or sheets, pressed into contact with the heating elements by means of the hinged cover 30 illustrated in Fig. 2.

In Fig. 7, I have illustrated a modification of the circuit arrangement described with reference to Fig. 6, by means of which one heating element at a time may be brought into circuit through the agency of the switch 48, thus making it unnecessary to provide a battery with greater amperage output than is necessary for the heating of one element at a time.

The record sheet or ticket shown in Fig. 5 may include any convenient information in addition to the meter reading, such, for example as the meter number, the date of reading, consumer's name and location, and any other convenient information, or it may constitute a part of the bill left with, or later sent, to the subscriber.

In using the device of my invention for recording the readings of electric meters, means may be provided by which current for heating the elements can be taken from the conductors supplying current to the meter itself, though I preferably use a small storage battery even for recording the readings of electric meters. In place of this battery a small hand power generator may be provided, or, in fact, any other source of electric supply may be utilized, this feature forming no part of my invention.

As designed to be operated, the inspector or reader of the meter after opening the cover of the dial plate (which may be sealed with a paper or other form of seal) and inserting duplicate or triplicate record sheets in the recorder, brings the recorder into alinement with the meter face and pushes it forward so that the pins enter the perforations and one pin of each group comes into contact with the hand of its associated dial in whatever position the hand may be found. Circuits are then established through the meter frame and battery so that four of the recording elements are energized or heated and burn or scorch or otherwise electrically record upon both of the recording sheets a mark opposite the numeral which is indicated by each of the hands and in the respective column or position showing the units, tens, hundreds or thousands represented by each dial. From this record the meter reading may be entered in figures at the foot of the columns, and these figures will indicate the reading of the meter at that time. The entry of the previous reading will make it possible to deduct the smaller from the larger figure and ascertain the amount consumed and with which the customer is charged at that time. From this a bill and collection may then be made if desired, leaving a duplicate in the hands of the customer and retaining the original for the records of the company.

Having thus described my invention, what I claim as new and desire to secure by United States Letters Patent is:

1. In a recording device for meters and the like having moving indicating hands, a portable device for interchangeable use with different meters comprising a plurality of spaced contact members for registration with the meter hands, a plurality of high resistance electrical conductors in fixed positions, each of said contact members being permanently connected with one of said high resistance electrical conductors, means for supporting a record sheet of paper in fixed position in contact with all of said high resistance electrical conductors, a source of electrical energy, and means for connecting said source of electrical energy between one terminal of each of said high resistance electrical conductors and said indicating hands, the voltage of said source of electrical energy being such that when any of the said high resistance conductors is connected through said circuits with said source of electrical energy that conductor is heated to a temperature such as to scorch the portion of the record sheet of paper in contact therewith.

2. The combination with a meter provided with a dial and movable indicators traveling thereover, of a portable device for use interchangeably with different meters comprising a plurality of spaced contact members for registration with said movable indicators in their several positions, a suitable frame of insulating material, a plurality of high resistance conductors supported in said frame, each of said contact members being permanently connected with one of said high resistance conductors, means for supporting a record sheet of paper in contact with all of said conductors, a source of electrical energy such that the connection of any of said high resistance conductors therewith will cause the connected conductor to become heated, due to its resistance to the flow of current therethrough, to a temperature such as to scorch the portion of the record sheet of paper in contact therewith, and means for connecting said conductors in circuit with said source of electrical energy through the said movable indicators and the said spaced contact members.

3. A portable recording device for registering readings of different meters on record sheets of paper, comprising a plurality of electrically energized heating elements, each lying in a fixed position entirely on one side of a record sheet of paper, means for pressing a record sheet of paper against the said heating elements, and electrical connections having terminals adapted to be brought into contact with moving parts of the meter being recorded for electrically energizing certain of the said heating elements as determined by the position of the movable parts of the meter, whereby the record sheet of paper is scorched in positions determined by the position of the said movable parts of the meter to indicate the positions of the said movable parts.

In witness whereof, I hereunto subscribe my name this 21st day of July, A. D. 1915.

ANGUS S. HIBBARD.

Witnesses:
M. E. GAVITT,
MOSTEN S. JOHNSON.